US 10,169,373 B2

(12) United States Patent
Moran

(10) Patent No.: US 10,169,373 B2
(45) Date of Patent: Jan. 1, 2019

(54) RETROREFLECTIVE OBJECT TAGGING

(71) Applicant: SugarCRM Inc., Cupertino, CA (US)

(72) Inventor: Wes Moran, Merrimack, NH (US)

(73) Assignee: SUGARCRM INC., Cupertino, CA (US)

( * ) Notice: Subject to any disclaimer, the term of this patent is extended or adjusted under 35 U.S.C. 154(b) by 805 days.

(21) Appl. No.: 14/468,689

(22) Filed: Aug. 26, 2014

(65) Prior Publication Data
US 2016/0065443 A1  Mar. 3, 2016

(51) Int. Cl.
*G06F 17/30* (2006.01)
*H04L 29/08* (2006.01)

(52) U.S. Cl.
CPC ...... *G06F 17/30268* (2013.01); *G06F 17/301* (2013.01); *G06F 17/30265* (2013.01); *G06F 17/30345* (2013.01); *G06F 17/30997* (2013.01); *H04L 67/10* (2013.01)

(58) Field of Classification Search
CPC ......... G06F 17/30002; G06F 17/30861; G06F 17/30268; G06F 17/30038; G06F 17/30265; G06F 17/30011; G06F 17/3012; G06F 21/6218; G06F 17/301; G06F 17/30345; G06Q 10/10; H04L 67/10; G04F 17/30997
USPC ......... 707/624–625, 955, 740, 736; 709/204, 709/224; 715/854, 771
See application file for complete search history.

(56) References Cited

U.S. PATENT DOCUMENTS

| | | | | |
|---|---|---|---|---|
| 5,855,013 A * | 12/1998 | Fisk | ................. | G06F 17/30607 |
| 6,192,370 B1 * | 2/2001 | Primsch | ........... | G06F 17/30607 |
| 6,708,166 B1 * | 3/2004 | Dysart | ............. | G06F 17/30607 707/758 |
| 7,813,557 B1 * | 10/2010 | Bourdev | ........... | G06F 17/30268 382/205 |
| 8,010,548 B1 * | 8/2011 | Beddow | ........... | G06F 17/30044 707/760 |
| 8,224,851 B2 * | 7/2012 | Banda | ............... | G06F 17/30997 707/781 |
| 8,229,931 B2 * | 7/2012 | Rothmuller | ....... | G06F 17/30038 707/738 |
| 8,364,718 B2 * | 1/2013 | Kirby | ................ | G06F 17/30884 707/736 |
| 8,516,106 B2 * | 8/2013 | Augenstein | .......... | G06F 11/324 709/224 |
| 8,805,785 B2 * | 8/2014 | Vasudevan | ........ | G06F 17/30011 707/625 |
| 2004/0078508 A1 * | 4/2004 | Rivard | ............... | G06F 11/2089 711/4 |

(Continued)

*Primary Examiner* — Ramy M Osman
(74) *Attorney, Agent, or Firm* — Steven M. Greenberg, Esq.; Shutts & Bowen LLP

(57) ABSTRACT

A method for retroreflective tagging of objects in a data processing system is described herein. The method includes first monitoring tagging of objects in memory of the data processing system. Subsequently, an application of a new tag to an existing one of the objects can be detected that differs from a previously applied tag of the existing one of the objects. Thereafter, the end user responsible for the new tag can be prompted to retroreflectively tag the existing one of the objects with the new tag. In response to an affirmation by the end user, the new tag is applied to the existing one of the objects and also to others of the objects tagged with the previously applied tag.

9 Claims, 1 Drawing Sheet

(56) References Cited

U.S. PATENT DOCUMENTS

| | | | |
|---|---|---|---|
| 2005/0063575 A1* | 3/2005 | Ma | G06F 17/30265 382/128 |
| 2006/0074973 A1* | 4/2006 | Platt | G06F 17/30038 |
| 2008/0270351 A1* | 10/2008 | Thomsen | G06F 17/30545 |
| 2008/0275851 A1* | 11/2008 | Taylor | G06Q 30/02 |
| 2008/0282198 A1* | 11/2008 | Brooks | G06Q 10/10 715/854 |
| 2009/0100078 A1* | 4/2009 | Lai | G06F 17/30731 |
| 2009/0254601 A1* | 10/2009 | Moeller | G06F 9/542 709/201 |
| 2009/0265631 A1* | 10/2009 | Sigurbjornsson | G06Q 10/10 715/716 |
| 2010/0054601 A1* | 3/2010 | Anbalagan | G06F 17/30265 382/180 |
| 2010/0058195 A1* | 3/2010 | Stefik | G06F 17/3089 715/744 |
| 2010/0114988 A1* | 5/2010 | Linn | G06Q 10/10 707/805 |
| 2010/0229082 A1* | 9/2010 | Karmarkar | H04M 1/72547 715/205 |
| 2010/0232656 A1* | 9/2010 | Ryu | G06F 17/30265 382/118 |
| 2010/0293270 A1* | 11/2010 | Augenstein | G06F 11/324 709/224 |
| 2011/0060895 A1* | 3/2011 | Solomon | G06F 8/36 713/1 |
| 2011/0081952 A1* | 4/2011 | Song | H04N 1/0035 455/566 |
| 2011/0145275 A1* | 6/2011 | Stewart | G06F 17/3002 707/769 |
| 2012/0036132 A1* | 2/2012 | Doyle | G06F 17/30038 707/738 |
| 2012/0194519 A1* | 8/2012 | Bissell | G06F 17/30905 345/428 |
| 2013/0290107 A1* | 10/2013 | Santhiveeran | G06Q 30/02 705/14.65 |
| 2014/0074922 A1* | 3/2014 | Bell | G06Q 50/01 709/204 |
| 2014/0122430 A1* | 5/2014 | Dary | G06F 17/30309 707/624 |
| 2014/0359505 A1* | 12/2014 | Cisler | G06F 17/30103 715/769 |
| 2015/0009117 A1* | 1/2015 | Peters | G06F 3/013 345/156 |
| 2015/0033362 A1* | 1/2015 | Mau | G06K 9/00288 726/27 |
| 2015/0088815 A1* | 3/2015 | Billapati | G06F 17/30289 707/609 |
| 2015/0095642 A1* | 4/2015 | Spalka | G06F 21/6218 713/161 |
| 2015/0142813 A1* | 5/2015 | Burgmeier | G06F 17/30598 707/740 |
| 2015/0193550 A1* | 7/2015 | Bastide | G06F 17/30719 707/748 |
| 2015/0205829 A1* | 7/2015 | Bastide | G06F 17/30386 707/758 |
| 2016/0042030 A1* | 2/2016 | Bertram | G06F 17/3012 707/736 |
| 2016/0170625 A1* | 6/2016 | Zambetti | G06F 3/0362 715/771 |
| 2017/0208088 A1* | 7/2017 | Molloy | H04L 63/1433 |

* cited by examiner

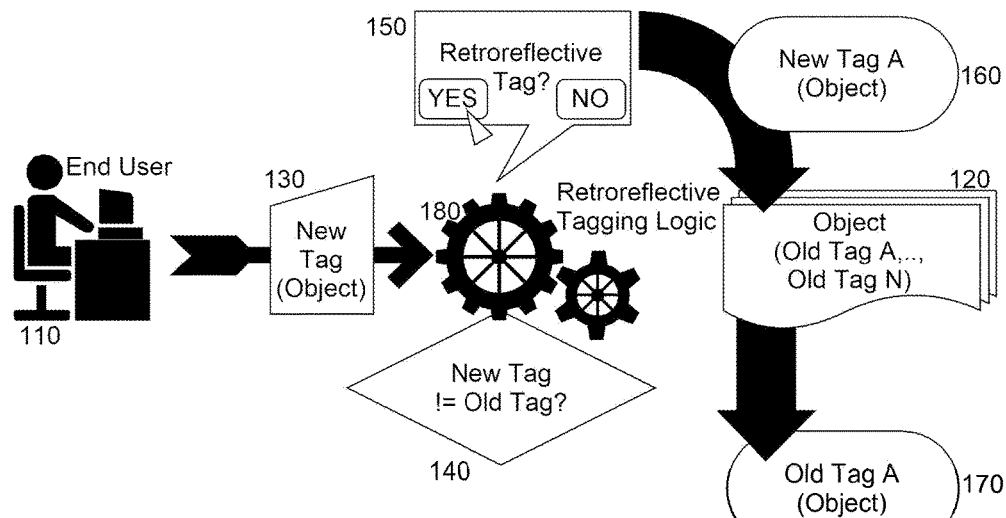
FIG. 1
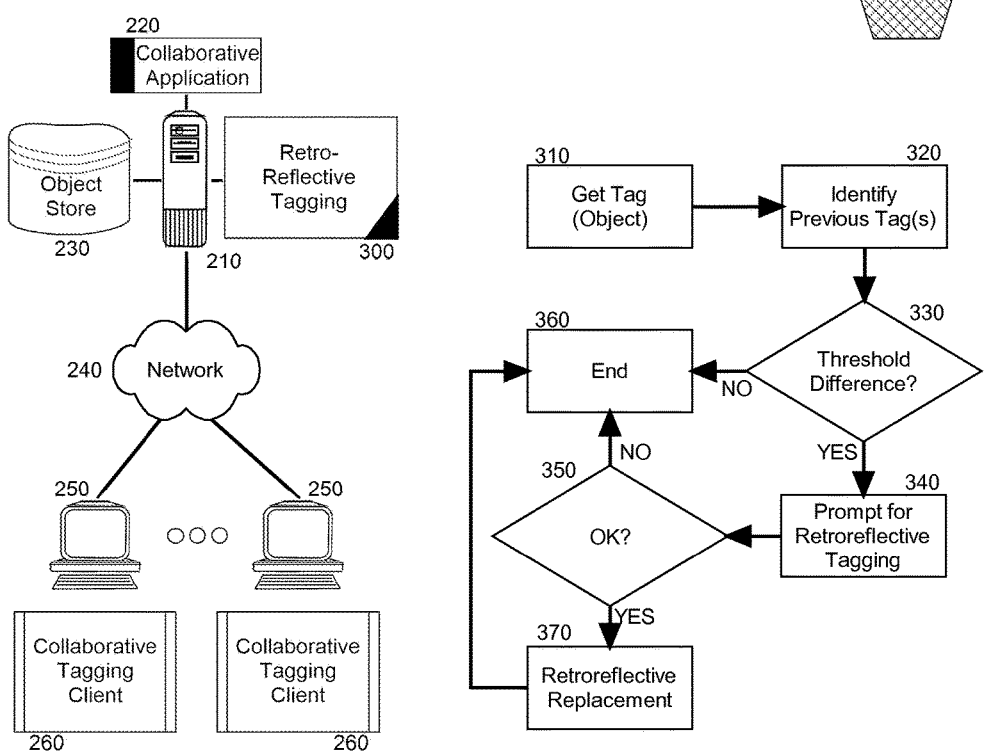
FIG. 2  FIG. 3

RETROREFLECTIVE OBJECT TAGGING

BACKGROUND OF THE INVENTION

Field of the Invention

The present invention relates to data object tagging and more particularly to tag management for data objects in an object store.

Description of the Related Art

A data store offers an organized mechanism for storing, managing and retrieving information. Data stores exist in the most rudimentary form of a flat file in which each line of the file is a record and each number or string separated by a pre-determined delimiter is a field of the record. More advanced data stores organize data through the use of structured tables able to be managed by way of a database management system ("DBMS"). Modern data stores are organized through a number of different technological paradigms, including relational models (relational database), object models (object database), document models (document database), and the like. In most cases, the structure and organization of data in the data store (namely the different tables, and records and fields defined therein) conform to a pre-defined schema intended to model a problem and/or solution evidenced by the database.

Objects in a data store are often viewed according to a pre-configured paradigm. The pre-configured paradigm in many instances is dictated at design time by the application designer and hard coded into the application itself. With the advent of the Internet and the search engine, the notion of the ad hoc organization of data into a dynamically produced result set has become commonplace. Today, the most common end user enjoys access to query-driven result set creation from amongst a vast sea of objects. Yet, even considering the power of the modern search engine, end users are still restricted to the naming parameters of searched objects and the metadata associated therewith.

Object tagging is a concept that allows individuals to apply a name or characterization to an object that has a different named assigned thereto at the time of creation. Tagging initially enjoyed wide scale utilization in the field of social bookmarking and since has become part and parcel of many advanced enterprise computing systems in which a large number of data objects subsist and require varied query based access by different end users of the system. Yet, the ad hoc tagging of objects suffers from tag variations that occur as a result of tags being applied to the same object or object type over a long period of time, or as a result of tags being applied to the same object or object type by a multiplicity of end users.

What results is an object with both fresh tags and stale tags. Replacing the stale tags with fresh tags is a manually intensive process that requires the individual to mentally consider the relevance and freshness of both an old and new tag in order to determine whether or not to replace the old tag with the new, or to permit both tags to exist for a single object or object type.

BRIEF SUMMARY OF THE INVENTION

Embodiments of the present invention address deficiencies of the art in respect to object tagging and provide a novel and non-obvious method, system and computer program product for retroreflective tagging of objects in a data processing system. In an embodiment of the invention, a method for retroreflective tagging of objects in a data processing system includes first monitoring tagging of objects in memory of the data processing system. Subsequently, an application of a new tag to an existing one of the objects can be detected that differs from a previously applied tag of the existing one of the objects. Thereafter, the end user responsible for the new tag can be prompted to retroreflectively tag the existing one of the objects with the new tag in place of the previously applied tag. In response to an affirmation by the end user, the new tag is applied to the existing one of the objects and also to others of the objects tagged with the previously applied tag.

In one aspect of the embodiment, the previously applied tag is discarded in connection with the existing one of the objects and the others of the objects. In another aspect of the embodiment, the prompting and applying occurs only when the existing one of the objects and the others of the objects have been tagged with the new tag for a threshold number of times. In yet another aspect of the embodiment, the prompting and applying occurs only when the existing one of the objects and the others of the objects have been tagged with the new tag by a threshold number of end users.

In another embodiment of the invention, a data processing system can be configured for retroreflective tagging of objects. The system can include a host computing system that includes at least one computer with memory and at least one processor and a data store of objects coupled to the host computing system. The system also can include a collaborative computing application executing in the memory of the host computing system and providing access to the objects in the data store to different end users over a computer communications network. Finally, the system can include a retroreflective tagging module coupled to the collaborative computing application.

The module can include program code enabled upon execution to monitor tagging of the objects in the data store by the different end users. The program code also can be enabled upon execution to detect an application by a particular end user of a new tag to an existing one of the objects that differs from a previously applied tag of the existing one of the objects. The program code further can be enabled upon execution to prompt the particular end user to retroreflectively tag the existing one of the objects with the new tag. Finally, the program code can be enabled upon execution to apply the new tag to the existing one of the objects and also to others of the objects tagged with the previously applied tag.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for retroreflective tagging of objects in a data processing system;

FIG. 2 is a schematic illustration of a data processing system configured for retroreflective tagging of objects; and, FIG. 3 is a flow chart illustrating a process for retroreflective tagging of objects in a data processing system.

DETAILED DESCRIPTION OF THE INVENTION

Embodiments of the invention provide for retroreflective tagging of objects in a data processing system. In accordance with an embodiment of the invention, the tagging of objects in a data processing system can be monitored. A correlation in memory can be maintained between different applied tags and corresponding objects such that an inspection of the memory can determine a list of tags for each object in the memory and also a number of end users of the data processing system who have applied a similar or same tag to a corresponding one of the objects. In response to detecting a tagging of an object with a new tag that differs from a previously applied tag to the object, the new tag can be applied to the object as well as the previously applied tag for the object can be replaced with the new tag. Optionally, the replacement of the previously applied tag with the new tag can be occur only when the new tag has been applied a threshold number of times.

In further illustration, FIG. 1 is a pictorial illustration of a process for retroreflective tagging of objects in a data processing system. As shown in FIG. 1, retroreflective tagging logic 180 can monitor the tagging of different objects 120 in an object store. Objects 120 can include any sort of persistent data structure, such as a single value variable instance to a multivariate class instance including one or more methods encapsulated therein to a document, image or both. Each of the objects 120 can have one or more previously applied tags associated therewith applied one one or more end users accessing the objects 120 of the data store.

An end user 110 can apply a new tag 130 to an existing one of the objects 120 previously tagged with other tags. The retroreflective tagging logic 180 can detect the tagging of the existing one of the objects 120 with the new tag 130. Thereafter, the retroreflective tagging logic 180 can apply a comparator function 140 to determine whether or not the new tag 130 differs from one or more existing tags of the existing one of the objects 120. The comparator function 140 can determine if the new tag 130 literally differs from the existing tags of the existing one of the objects 120, or in a more advanced implementation, the comparator function 140 can determine if the new tag 130 is not synonymous with the existing tags of the existing one of the objects 120.

Depending upon the result of the comparator function 140, the retroreflective tagging logic 180 can present a prompt 150 to the end user 110 seeking to not only apply a new tag 160 based upon the new tag 130 to the existing one of the objects 120, but also to retroreflectively tag others of the objects 120 also associated with the existing tag of the existing one of the objects 120. In this regard, retroreflectively tagging the others of the objects 120 refers to the addition of the new tag 160 to the others of the objects 120 and the optional discarding of the previously associated tags 170.

The process described in connection with FIG. 1 can be implemented in a data processing system configured for object tagging. In further illustration, FIG. 2 is a schematic illustration of a data processing system configured for retroreflective tagging of objects. The system can include a host computing system 210 that includes one or more computers each with memory and at least one processor. The host computing system 210 can be communicatively coupled to different client computers 250 over computer communications network 240. The host computing system 210 can be coupled to a data store of objects 230, for example a database or object base or, in a more simplistic implementation, a file hierarchy of documents.

The host computing system 210 additionally can support the operation of a collaborative applications 220 executing in the memory of the host computing system 210 and enabled to permit end users to tag the objects of the object store 230 by way of a collaborative tagging client 260 presented in each of the client computers 250. Of note, a retroreflective tagging module 300 can be coupled to the collaborative application 220. The retroreflective tagging module 300 can include program code that when executed in the memory of the host computing system 210, is enabled to monitor the tagging of objects in the object store 230, to detect an application through a collaborative tagging client 260 of a new tag to an existing one of the objects that differs from a previously applied tag of the existing one of the objects, to prompt in the collaborative tagging client 260 for a retroreflective tagging of the existing one of the objects with the new tag, and to apply the new tag to the existing one of the objects and also to others of the objects tagged with the previously applied tag.

In even yet further illustration of the operation of the retroreflective tagging module 300, FIG. 3 is a flow chart illustrating a process for retroreflective tagging of objects in a data processing system. Beginning in block 310, a specified object can be tagged with a new tag. In block 320, previously applied tags for the specified object can be identified as can other objects that had been previously tagged with the previously applied tags. In decision block 330, it can be determined whether or not a threshold number of end users have applied the new tag to the specified object and the other objects. In another aspect of the embodiment, it can be determined whether or not the new tag has been applied a threshold number of times to the specified object and the other objects by one or more of the end users.

If not, in decision block 360 the specified object can be tagged with the new tag and the process can end. Otherwise, in block 340 the end user applying the new tag can be prompted to retroreflectively tag the specified object and the other objects with the new tag. In decision block 350, if the end user answers in the affirmative, in block 370 the new tag can be applied to the specified object and the other objects. Optionally, the previously applied tag can be discarded—namely disassociated from the specified object and the other objects.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. A method for retroreflective tagging of objects in a data processing system, the method comprising:
    monitoring tagging of objects in memory of the data processing system;
    detecting an application of a new tag to an existing one of the objects that differs from a previously applied tag of the existing one of the objects by applying a comparator function to the new tag and one or more existing tags of the one of the objects;
    prompting in a display of the data processing system for a retroreflective tagging of the existing one of the objects with the new tag in which previously applied tags to all objects for which a new tag has been applied are replaced with the new tag;
    applying the new tag to the existing one of the objects and also to others of the objects tagged that have been already tagged with the previously applied tag; and,
    disregarding the previously applied tag in connection with the existing one of the objects and the others of the objects.

2. The method of claim 1, wherein the prompting and applying occurs only when the existing one of the objects and the others of the objects have been tagged with the new tag for a threshold number of times.

3. The method of claim 1, wherein the prompting and applying occurs only when the existing one of the objects and the others of the objects have been tagged with the new tag by a threshold number of end users.

4. A data processing system configured for retroreflective tagging of objects, the system comprising:
    a host computing system comprising at least one computer with memory and at least one processor;
    a data store of objects coupled to the host computing system;
    a collaborative computing application executing in the memory of the host computing system and providing access to the objects in the data store to different end users over a computer communications network; and,
    a retroreflective tagging module coupled to the collaborative computing application, the module comprising program code enabled upon execution to monitor tagging of the objects in the data store by the different end users, to detect an application by a particular end user of a new tag to an existing one of the objects that differs from a previously applied tag of the existing one of the objects by applying a comparator function to the new tag and one or more existing tags of the one of the objects, to prompt the particular end user to retroreflectively tag the existing one of the objects with the new tag in which previously applied tags to all objects for which a new tag has been applied are replaced with the new tag, to apply the new tag to the existing one of the objects and also to others of the objects tagged that have been already tagged with the previously applied tag and to disregard the previously applied tag in connection with the existing one of the objects and the others of the objects.

5. The system of claim 4, wherein the prompting and applying occurs only when the existing one of the objects and the others of the objects have been tagged with the new tag for a threshold number of times.

6. The system of claim 4, wherein the prompting and applying occurs only when the existing one of the objects and the others of the objects have been tagged with the new tag by a threshold number of end users.

7. A computer program product for retroreflective tagging of objects in a data processing system, the computer program product comprising a non-transitory computer readable storage medium having program instructions embodied therewith, the program instructions executable by a device to cause the device to perform a method comprising:
    monitoring tagging of objects in memory of the data processing system;
    detecting an application of a new tag to an existing one of the objects that differs from a previously applied tag of the existing one of the objects by applying a comparator function to the new tag and one or more existing tags of the one of the objects;
    prompting in a display of the data processing system for a retroreflective tagging of the existing one of the objects with the new tag in which previously applied tags to all objects for which a new tag has been applied are replaced with the new tag;
    applying the new tag to the existing one of the objects and also to others of the objects tagged that have been already tagged with the previously applied tag; and,
    disregarding the previously applied tag in connection with the existing one of the objects and the others of the objects.

8. The computer program product of claim 7, wherein the prompting and applying occurs only when the existing one of the objects and the others of the objects have been tagged with the new tag for a threshold number of times.

9. The computer program product of claim 7, wherein the prompting and applying occurs only when the existing one of the objects and the others of the objects have been tagged with the new tag by a threshold number of end users.

* * * * *